Sept. 11, 1956 H. L. ECKERT 2,762,240
DIFFERENTIAL PINION MOUNTING
Filed Sept. 28, 1954

Inventor
Herbert L. Eckert
By Charles L. Schwab
Attorney

United States Patent Office 2,762,240
Patented Sept. 11, 1956

2,762,240

DIFFERENTIAL PINION MOUNTING

Herbert L. Eckert, Cedar Rapids, Iowa, assignor to Allis-Chalmers Manufacturing Company, Milwaukee, Wis.

Application September 28, 1954, Serial No. 458,811

3 Claims. (Cl. 74—711)

The invention relates to power transmitting gearing and it is concerned more particularly with a bevel gear differential, that is, a differential wherein a pair of bevel side gears are rotatably mounted within a cage on the axis of rotation of the latter and a set of planetary bevel pinions in mesh with the side gears are rotatably mounted within the cage on shafts disposed on axes radiating from the axis of rotation of the cage.

Bevel gear differentials are widely used in motor vehicles and, generally, it is an object of the invention to provide an improved automotive type of bevel gear differential which permits removal of the planet pinions and their mounting shafts from the cage without the necessity of first removing the cage from its supporting structure so that a substantial amount of time may be saved when the planet pinions and their shafts are to be inspected or replaced.

More specifically, it is an object of this invention to provide an improved bevel gear differential mechanism of the hereinbefore outlined character wherein the planet pinion shafts are rigidly mounted at their opposite ends on the differential cage.

A further object of this invention is to provide an improved bevel gear differential of the hereinbefore outlined character in which the side gears are floatingly mounted relative to the differential cage and are centered on the axis of rotation of the cage by the bevel planet pinions.

A further object of the invention is to provide an improved bevel gear differential of the hereinbefore outlined character in which the planet pinions are rotatably mounted on separate shafts in registering relation, respectively, with peripheral apertures of the cage, and in which the peripheral cage apertures, pinion shafts and planet pinions are relatively proportioned so that the pinion shaft may be outwardly withdrawn from the cage and so that the pinions may be moved into and out of the cage through their respective cage apertures.

It is a further object of this invention to provide a differential mechanism of the hereinbefore outlined character in which the individual pinion shafts each have a cap portion in bridging or covering relation to the associated peripheral cage aperture.

It is a further object to provide an improved bevel gear differential which is relatively inexpensive to build and gives satisfactory service.

These and other objects and advantages of this invention will be evident from the following description when read in connection with the accompanying drawings, in which.

Figure 1:
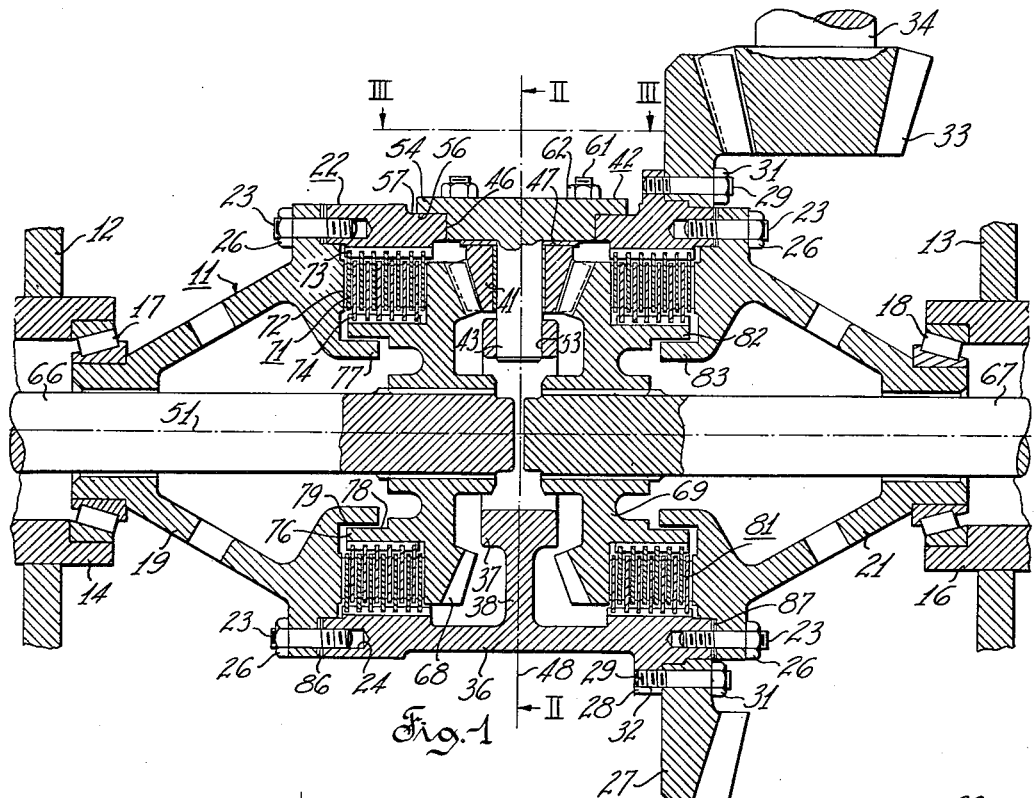
Fig. 1 is a sectional view taken on line I—I in Fig. 2, of a bevel gear differential installation for motor vehicles.

Referring to Fig. 1, a differential cage 11 is rotatably supported on stationary walls 12 and 13 through supporting tubes 14 and 16 and tapered roller bearings 17 and 18. The cage 11 is of three piece construction and is formed of a pair of end members 19 and 21 and a central member 22, the end members being nonrotatably and fixedly secured to the central member 22 by a plurality of stud bolts 23 threaded into drilled and tapped holes 24 and nuts 26 threaded onto the outer ends of the stud bolts. A bevel ring gear 27 is secured to a circular flange 28 formed on central member 22 of the cage 11 by a plurality of stud bolts 29 and nuts 31, the stud bolts 29 being threaded into drilled and tapped holes 32 in circular flange 28. The ring gear 27 is driven by a driving pinion 33 formed on the end of a power supply shaft 34 connected to a power source, not shown.

Figures 2, 3:
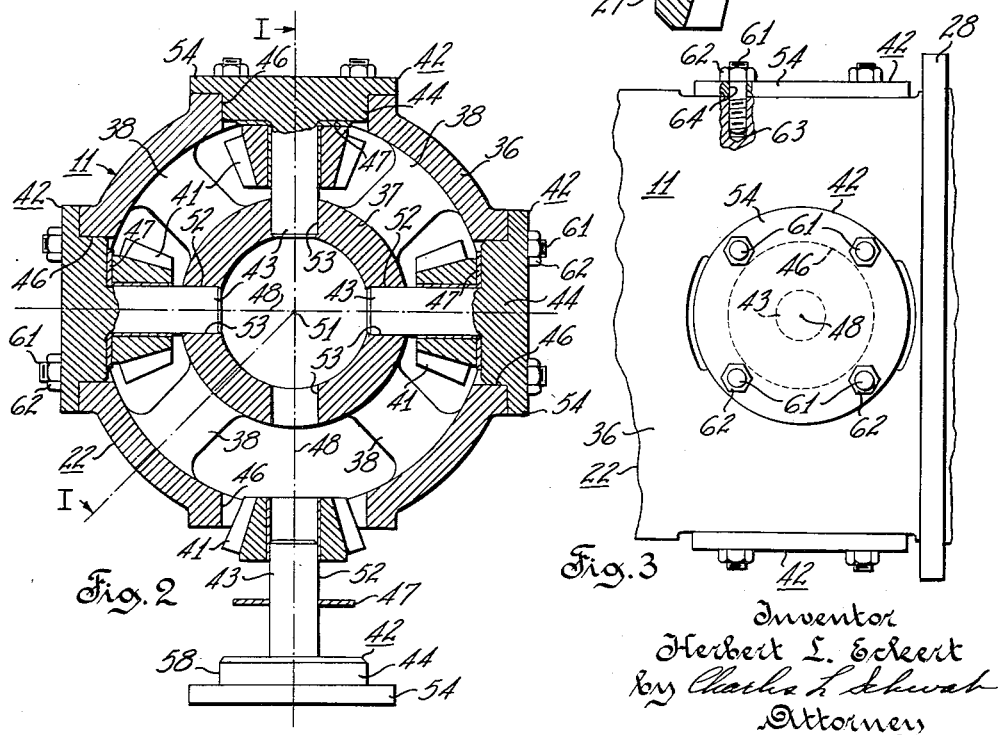
Fig. 2 is a sectional view taken on line II—II in Fig. 1 with a bevel planet pinion, pinion shaft and thrust washer exploded from their installed condition on the differential cage.
Fig. 3 is a side view taken on line III—III in Fig. 1 with parts cut away for purposes of exposure.

Referring to Figs. 1 and 2, the central member 22 of cage 11 has an outer axially extended wall 36 and an internal ring 37 which are concentric and rigidly interconnected by four radial webs 38 formed integrally with the wall 36 and ring 37. Four bevel planet pinions 41 are rotatably supported in radial spaces between the wall 36 and ring 37 by spindle plugs or pinion supporting members 42. The plugs 42 each have a spindle portion 43 and disk head or cap portion 44, the spindle portions 43 being seated at their free ends in bores 53 of the ring 37, and the cap portions 44 being seated in peripheral apertures 46 of the outer wall 36. The cap portions 44 are releasably and nonrotatably secured to the outer side of the outer wall 36 of the cage 11 in bridging relation to their respective cage apertures 46. A pinion thrust washer 47 is interposed between each pinion 41 and cap portion 44.

The axes 48 of the four spindle plugs 42 radiate from the axis of rotation 51 of cage 11 and are spaced equally about the axis 51. Also, axes 48 lie in a plane which is disposed at right angles to axis 51. Each spindle portion 43 has a cylindrical thrust transmitting surface 52 in radial load transmitting engagement with a complementary cylindrical bearing surface presented by the associated radial bore 53 in ring 37. The surfaces 52 of the spindle portions 43 are closely fitted into their respective bores 53 to provide a rigid mounting; however, the spindle portions may be withdrawn radially outward relative to the axis of rotation of the cage 11 as will be hereinafter more fully explained.

The cap portions 44 of the plugs 42 each have a circular flange 54 which presents a thrust transmitting surface 56 in thrust transmitting relation to a complementary surface 57 formed on the radially outer side of the outer wall 36. Also, the cap portions 44 each have a cylindrical thrust transmitting surface 58 formed concentric with the spindle portion 43 and in complementary, contacting relation with a cylindrical bearing surface presented by the aperture 46.

Referring to Figs. 1, 2 and 3, the cap portion 44 of each of the plugs 42 is secured to the outer wall 36 of the cage 11 by four stud bolts 61 and nuts 62. In Fig. 3, parts of the cage 11 and cap portion 44 of one of the plugs 42 have been cut away to expose the drilled and tapped hole 63 into which the stud bolt 61 is threaded, and to expose the hole 64 in cap portion 44 through which the stud bolt 61 extends. The other stud bolts 61 are similarly installed.

Referring to the lower part of Fig. 2, the nuts have been removed from the four stud bolts 61 and the plug 42, washer 47 and pinion 41 at the lower side of the cage 11 have been exploded radially outward from their installed position to clearly show that the plug 42, pinion 41 and washer 47 are withdrawable radially outward from the cage 11. The aperture 46 is large enough to permit passage of the pinion 41 therethrough.

Referring again to Fig. 1, a pair of differential half shafts 66 and 67 extend into the cage 11 and have at their inner ends a pair of bevel side gears 68 and 69 splined to their inner ends, respectively. The splined connections between the side gears and half shafts are axially loose. The axial position of the side gear 68 is determined by the planet pinion 41 disposed on its tooth side and by a multiple disk unit 71 at its back side. The multiple disk unit 71 is interposed between a radially extending surface 72 formed on the interior of end member 19 of cage 11, and the back side of side gear 68. The multiple disk unit includes a series of driving disks 73 splined at their radially outer circumferences to the central member 22 of cage 11, and includes a series of driven disks 74 splined at their radially inner sides to an axially extending cylindrical flange 76 on the back side of side gear 68. The driving and driven disks 73, 74 are installed so that alternate disks are driving and, consequently, alternate disks are driven.

A cylindrical flange 77 is formed on end member 19 in radially inner relation to flange 76 of side gear 68. The radially inner surface 78 of flange 76 and the radially outer surface 79 of flange 77 are radially spaced from one another and, accordingly, side gear 68 is floatingly mounted relative to cage 11, that is, side gear 68 is in radially loose relation to the cage 11 by virtue of the clearance provided between surfaces 78 and 79.

The preceding description is equally applicable to the multiple disk unit 81 axially interposed between the back side of side gear 69 and end member 21 of cage 11. A radial clearance is provided between cylindrical flange 82 on the rear of side gear 69 and cylindrical flange 83 formed on side member 21 of cage 11 and this clearance is similar to the radial clearance provided between flange 76 on side gear 68 and flange 77 on end member 19.

The multiple disk units 71 and 81 are provided to effect a proportioning of the torque between the output shafts 66 and 67. In operation the axially outward thrust transmitted to the side gear 68 by the pinions 41 cause the driving and driven disks 73, 74 to be compressed against each other and thereby the side gear 68 is urged to rotate with the cage. It follows that when the conditions are such that the shaft 66 is readily rotatable upon application of a small amount of torque, for instance, when the wheel associated with shaft 66 is on slippery footing and the other driving wheel is not, the multiple disk unit 71 will urge the side gear 68 to rotate at the same speed as the cage 11, rather than twice the speed, and thus torque will be transmitted to the axle 67 connected to the wheel with good traction.

A plurality of shims 86 are axially interposed between end member 19 and central member 22 of cage 11, and another plurality of shims 87 are interposed between end member 21 and central member 22. By varying the number of shims 86, 87 the proportioning of the torque may be adjusted according to requirements. Also, possible wear in the disks of the multiple disk units 71, 81 and possible wear in the teeth of the side gears 68, 69 and pinions 41 may be compensated for by removal of one or more of the shims 86, 87.

As previously described, clearance is provided between the side gear flanges 76, 82 and the cage flanges 77, 83, respectively, and this permits the side gears 68, 69 to be centered by the pinions 41 and thus effective operation of the multiple disk units 71, 81 is insured. It is evident that the pinions are subjected to greater load in this torque proportioning differential design than are the pinions of a differential of usual design wherein the side gears have hubs which are journaled on the cage. It is important that a stable mounting is provided for the pinion shafts in the present design, and such mounting has been provided for the shaft members 42 by supporting both their ends on the cage as previously described.

It should be understood that the invention is not limited to the herein disclosed details of construction and that the invention may be embodied in such other forms and modifications as are within the scope of the appended claims.

It is claimed and desired to secure by Letters Patent:

1. In a bevel gear differential, the combination of a rotary cage having an annular outer wall and an internal ring element integrally interconnected in concentric, radially spaced relation to each other, said outer wall presenting a peripheral aperture and said ring element presenting a cylindrical bearing surface defining a radial bore; a pinion supporting member having a spindle portion extending between said wall and ring element and having a cap portion formed integrally with said spindle portion and releasably and nonrotatably secured to the radially outer side of said outer wall in bridging relation to said aperture; said spindle portion being slidably fitted at its free end in said bore of said ring element so as to secure said pinion supporting member against displacement radially of its axis relative to said ring element and permit withdrawal of said supporting member in the direction of its axis from said ring element; and a bevel planet pinion rotatably journaled on said spindle portion intermediate said wall and ring element, said aperture and pinion being so proportioned and arranged as to accommodate passage of said pinion through said aperture.

2. A differential as set forth in claim 1 in which said peripheral aperture of said outer wall presents a cylindrical bearing surface and wherein said cap portion presents a complementary cylindrical surface in thrust transmitting engagement with said bearing surface of said peripheral aperture.

3. A differential as set forth in claim 2 in which said cap portion presents a circular flange having a thrust transmitting surface extending transversely of the axis of said spindle portion and disposed in abutting relation to a complementary thrust transmitting surface formed on said radially outer side of said outer wall adjacent said aperture.

References Cited in the file of this patent

UNITED STATES PATENTS

| | | |
|---|---|---|
| 430,660 | Leverich | June 24, 1890 |
| 1,396,225 | Logue | Nov. 8, 1921 |
| 2,064,152 | Conboy | Dec. 15, 1936 |
| 2,415,293 | Le Tourneau | Feb. 4, 1947 |
| 2,569,533 | Morgan | Oct. 2, 1951 |
| 2,650,507 | Clintsman | Sept. 1, 1953 |